Nov. 21, 1961 R. W. FOWLER 3,009,731
COMBINATION BOAT TRAILER AND SLEEPER
Filed Nov. 16, 1959 2 Sheets-Sheet 1

INVENTOR.
Raymond W. Fowler
BY
Sam J. Slotsky
ATTORNEY

Nov. 21, 1961    R. W. FOWLER    3,009,731
COMBINATION BOAT TRAILER AND SLEEPER
Filed Nov. 16, 1959    2 Sheets-Sheet 2
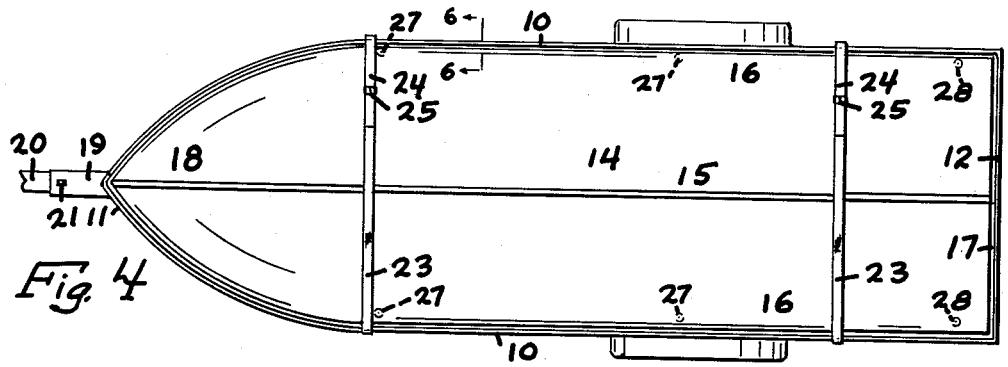
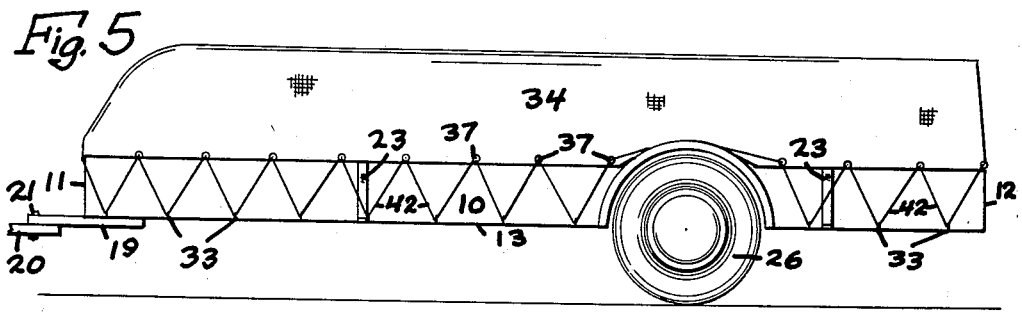
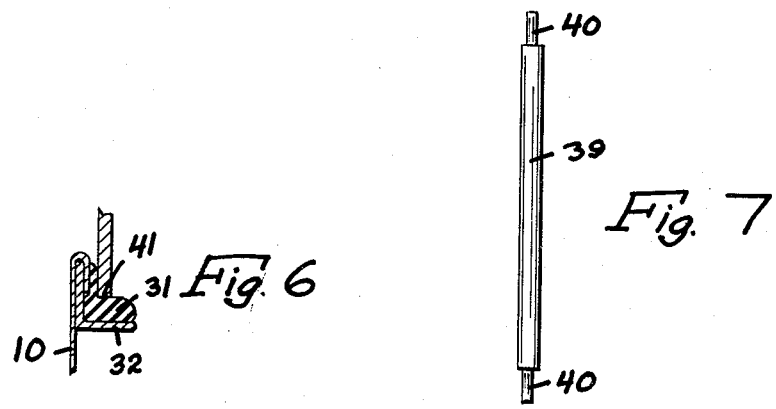
INVENTOR.
Raymond W. Fowler
BY
Sam J. Slotchy
ATTORNEY United States Patent Office 3,009,731
Patented Nov. 21, 1961

3,009,731
COMBINATION BOAT TRAILER AND SLEEPER
Raymond W. Fowler, 1501 Pierce St., Sioux City, Iowa
Filed Nov. 16, 1959, Ser. No. 853,231
1 Claim. (Cl. 296—23)

My invention relates to a combination boat trailer and sleeper.

An object of my invention is to provide a boat trailer which will carry a boat therein and wherein the said boat can be supported in a raised position, and which together with a further fabric member will then provide a complete housing enclosure for occupants to sleep in when the trailer is at rest.

A further object of my invention is to provide a simple arrangement which can be manufactured economically, and which is compact in structure.

Figure 1:
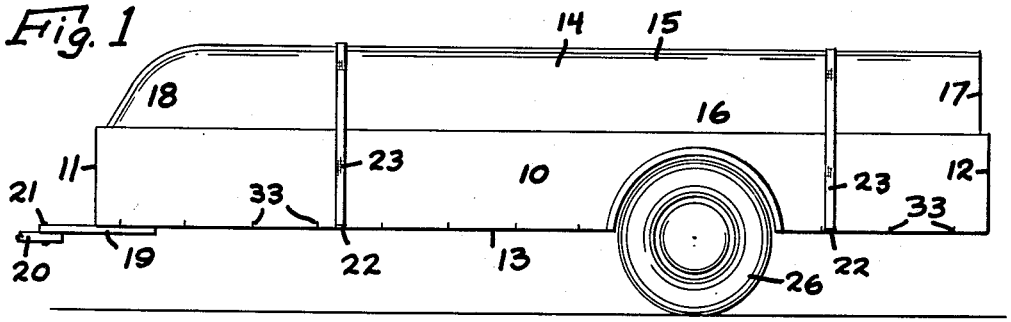
Figure 2:
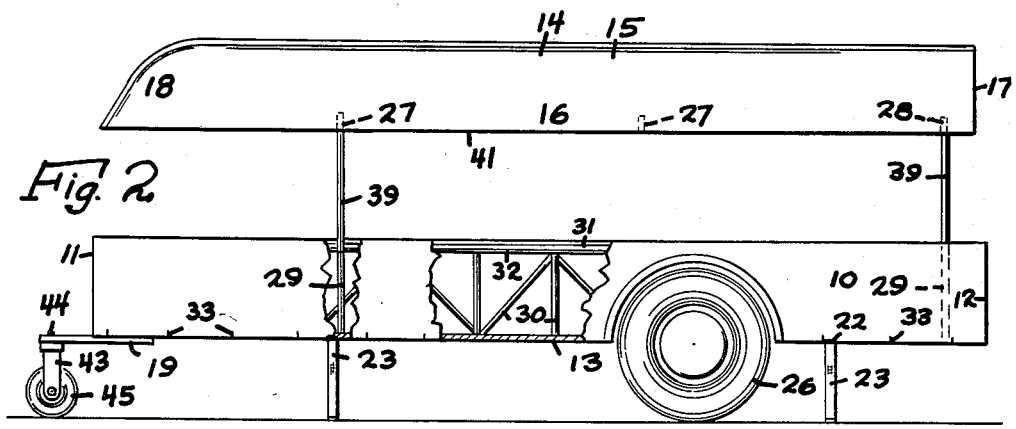
Figure 3:
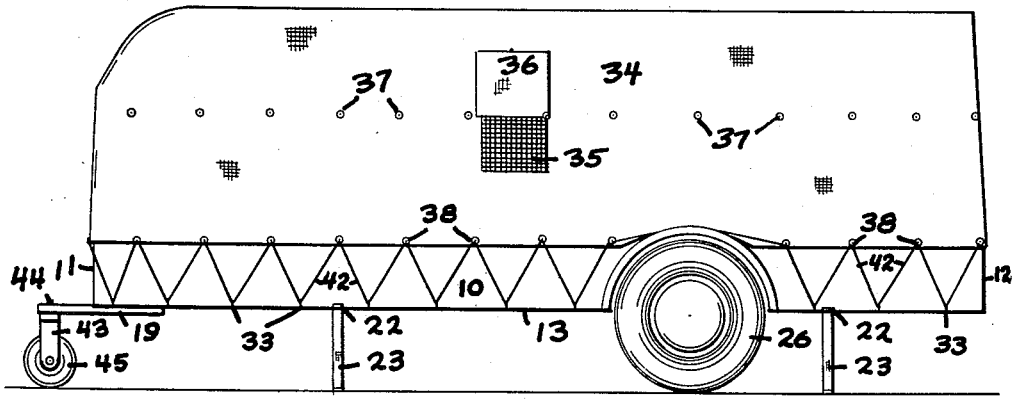

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a side elevation of the arrangement as being drawn by a vehicle,

FIGURE 2 is a further side elevation of the arrangement showing a step in the process for completing the enclosure, FIGURE 3 is a side elevation showing the arrangement used as a housing structure, FIGURE 4 is a plan view of FIGURE 1, FIGURE 5 is an elevation substantially similar to FIGURE 1 except showing the housing enclosure covering the structure, FIGURE 6 is an enlarged sectional detail taken along the lines 6—6 of FIGURE 4, and FIGURE 7 is a view of one of the spacing posts.

My invention contemplates the provision of a simple and compact arrangement whereby a boat can be provided in combination with a trailer member so that the boat can be transported therewith, and additionally so that the said boat will provide the roof structure of the unit when a housing enclosure is to be provided.

I have used the character 10 to designate the side walls of the lower part of the structure, the character 11 indicating a forward wall and the character 12 a rear wall and the character 13 indicating a bottom wall.

The lower structure has a configuration which coincides closely with the perimetric configuration of the boat which is indicated generally by the character 14, the boat having the bottom wall 15 merging into the side walls 16 and rear wall 17, the character 18 indicating the forward portion of the boat.

The character 19 indicates a hitching member by which the boat is pulled by the vehicle by means of the further member 20, the character 21 indicating the hitching pin.

Attached at 22 to the walls 10 are a pair of straps 23, and attached to the walls 10 on the other side of the arrangement (see FIGURE 4) are a further pair of straps 24, these straps being joined together by means of the buckles 25 when the unit is in the positions shown in FIGURES 1 and 4.

The character 26 indicates a pair of wheels which are suitably journalled to a lower shaft structure which supports the lower unit. The character 27 indicates the oar sockets (see FIGURE 2), and I provide a further pair of similar sockets 28 which are attached to the boat 14, and attached to the side walls 10 and to the bottom wall 13 are the four pipe members 29. The character 30 indicates further bracing members which serve to brace the sides of the lower unit. Passing about the upper perimeter of the lower unit, and attached to and within the side walls 10 and 12, is a resilient rubber member 31 which is attached to the angles 32, which angles are attached to these walls as explained. The character 33 indicates a series of spaced hooks which are attached to the walls 10 and 12.

The character 34 indicates a fabric covering member preferably made of a suitable canvas and the like, and which includes a plastic screen window 35 and an upper flap 36, the character 37 indicating a series of spaced grommets which are suitably attached to the fabric member 34, and the character 38 indicates a series of further spaced grommets, it being understood that these grommets are spaced about the entire body of the fabric cover 34.

The character 39 indicates a post or rod, which rod terminates in the reduced end portions 40.

FIGURE 1 shows how the unit is transported with the boat 14 being carried within the lower unit and with the lower edges 41 (see FIGURE 6) of the boat resting upon the resilient member 31, and if desired the boat can be strapped to the unit by means of the straps 23 and 24 and the buckles 25.

FIGURE 5 illustrates a preferred method, however, of transporting the boat in which the fabric member 34 is attached over the top of the boat and over the sides of the lower unit with the lower portions of the fabric member 34, or which portions are beneath the grommets 37 being folded upwardly and inwardly. In this manner the fabric unit will prevent rain, etc. from entering into the lower unit. Anything desired can be stored in the lower unit, and when the entire combination boat tralier and sleeper is brought to rest the unit can be made into the sleeper by first inserting the upper ends 40 of the four posts 39 into the sockets 27 and 28, and the lower ends 40 into the pipes 29 whereas the arrangement will appear as in FIGURE 2.

Next the fabric member 34 is unfolded to its complete width and is brought over the arrangement as shown in FIGURE 3, whereupon the cable or cord 42 is passed under the hooks 33 and through the lower grommets 38 as shown in FIGURE 3, to thereby securely fasten the arrangement whereupon the complete enclosure will provide a sleeper wherein persons can sleep within the unit. As shown in FIGURE 5 the same cable or cord 42 can be used to secure the fabric member 34 by means of the same hooks 33 and the upper grommets 37.

When the unit is used as a sleeper the straps 23 and 24 will rest upon the ground (see FIGURES 2 and 3).

Also when used as a sleeper the support member 43 is attached as at 44 to the member 19 with the wheel 45 being journalled thereto.

It will now be noted that my invention provides the advantages stated in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A combination boat trailer and sleeper comprising a lower base enclosure, said base enclosure being substantially of the perimetral configuration of a boat, a plurality of vertically positioned tubes attached within said base enclosure, a boat having oar sockets, a plurality of posts having reduced end portions at either end thereof, said end portions being received within said tubes, and within said oar sockets, strap members secured to the sides of said base enclosure for securing said boat during traveling conditions, an enlosing unit for providing a housing type structure, said enclosing unit being adapted to cover said boat and partially cover said base enclosure when said posts are in housing forming position, means for securing said enclosing unit including a plurality of grommets attached to the lower edges of said unit, hooks attached to said base enclosure, a cord passing through said grommets and under said hooks, a plurality of further grommets being attached to said enclosing unit and spaced above said grommets whereby the lower portions of said housing unit can be folded upwardly and whereby said further grommets can be attached by said cord to said hooks.

References Cited in the file of this patent

UNITED STATES PATENTS

| | | |
|---|---|---|
| D. 155,902 | Keating | Nov. 8, 1949 |
| 1,476,051 | Cassell | Dec. 4, 1923 |
| 2,216,553 | Greene | Oct. 1, 1940 |
| 2,266,769 | Kramer | Dec. 23, 1941 |
| 2,310,431 | Hart | Feb. 9, 1943 |
| 2,475,928 | Walls | July 12, 1449 |
| 2,502,024 | Poche | Mar. 28, 1950 |
| 2,598,458 | Somers | May 27, 1952 |
| 2,797,124 | Hauptli | June 25, 1957 |

FOREIGN PATENTS

| | | |
|---|---|---|
| 169,940 | Austria | Sept. 25, 1951 |
| 1,204,671 | France | Aug. 10, 1959 |
| 612,484 | Great Britain | Nov. 12, 1948 |